(12) United States Patent
Beeler et al.

(10) Patent No.: US 11,336,887 B2
(45) Date of Patent: May 17, 2022

(54) ADAPTIVE SHADING AND REPROJECTION

(71) Applicant: Facebook Technologies, LLC, Menlo Park, CA (US)

(72) Inventors: Dean Joseph Beeler, San Francisco, CA (US); Volga Aksoy, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/781,580

(22) Filed: Feb. 4, 2020

(65) Prior Publication Data
US 2021/0067765 A1   Mar. 4, 2021

Related U.S. Application Data

(60) Provisional application No. 62/895,314, filed on Sep. 3, 2019.

(51) Int. Cl.
| | | |
|---|---|---|
| H04N 13/00 | (2018.01) | |
| H04N 13/363 | (2018.01) | |
| H04N 13/344 | (2018.01) | |
| G06T 15/80 | (2011.01) | |
| G06T 15/20 | (2011.01) | |

(52) U.S. Cl.
CPC ......... *H04N 13/363* (2018.05); *G06T 15/205* (2013.01); *G06T 15/80* (2013.01); *H04N 13/344* (2018.05)

(58) Field of Classification Search
CPC ...... G02B 2027/0138; G02B 2027/014; G02B 2027/0187; G02B 27/0172; G02B 27/0179; G03B 21/001; G06T 17/10; G06T 19/006; G06T 15/80; G06T 15/205; Y10S 353/03; H04N 13/363; H04N 13/344
USPC ............................................................. 348/51
See application file for complete search history.

(56) References Cited

U.S. PATENT DOCUMENTS

| | | | | |
|---|---|---|---|---|
| 6,834,119 | B2* | 12/2004 | Chen | G06T 7/33 |
| | | | | 382/154 |
| 2016/0035140 | A1* | 2/2016 | Bickerstaff | G06T 19/006 |
| | | | | 345/633 |
| 2016/0219267 | A1* | 7/2016 | Chu | H04N 13/302 |
| 2016/0328879 | A1* | 11/2016 | Jin | G06T 17/20 |
| 2017/0155885 | A1* | 6/2017 | Selstad | G06T 3/00 |
| 2017/0213388 | A1* | 7/2017 | Margolis | G06T 19/006 |
| 2017/0374344 | A1* | 12/2017 | Boulton | H04N 13/398 |
| 2018/0329485 | A1* | 11/2018 | Carothers | G06T 7/536 |
| 2019/0005714 | A1* | 1/2019 | Fuller | G06T 1/20 |
| 2020/0312033 | A1* | 10/2020 | Ohashi | G09G 5/00 |

\* cited by examiner

*Primary Examiner* — Gims S Philippe
(74) *Attorney, Agent, or Firm* — Foley & Lardner LLP

(57) ABSTRACT

Disclosed herein includes a system, a method, and a device for rendering an image through adaptive reprojection. A first reprojection can be performed to generate a portion of a first image of a first view of a virtual space at a first rate. An amount of change from the first view to a second view of the virtual space can be determined. A portion of a second image of the second view of the virtual space can be determined to generate through a second reprojection. The second reprojection can be performed at a second rate to the portion of the second image according to the amount of change from the first view to the second view of the virtual space.

20 Claims, 7 Drawing Sheets

ADAPTIVE SHADING AND REPROJECTION

CROSS-REFERENCE TO RELATED APPLICATIONS

This application claims priority to U.S. Provisional Patent Application No. 62/895,314, filed Sep. 3, 2019, which is incorporated by reference in its entirety for all purposes.

FIELD OF DISCLOSURE

The present disclosure is generally related to rendering an image of a virtual space, including but not limited to adaptively performing reprojection to render an image of a virtual space.

BACKGROUND

Artificial reality, such as a virtual reality (VR), an augmented reality (AR), or a mixed reality (MR), provides immersive experience to a user. In one example, a user wearing a head wearable display (HWD) can turn his head to the left, and an image of a virtual object corresponding to a location of the HWD and a gaze direction of the user can be displayed on the HWD to allow the user to feel as if the user is moving within a space of an artificial reality (e.g., a VR space, an AR space, or a MR space).

In one implementation, an image of a virtual object is rendered through a shading process and a reprojection process to conserve computational resources and/or achieve bandwidth efficiency. In one example, the HWD includes various sensors that detect a location of the HWD and a gaze direction of the user wearing the HWD, and transmits the detected location and gaze direction to a console device through a wired connection or a wireless connection. The console device can determine a user's view of the space of the artificial reality according to the detected location and gaze direction, and generate an image of the space of the artificial reality corresponding to the user's view. The console device can transmit the generated image to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a method of rendering an image of a virtual reality. In some embodiments, the method includes performing, by at least one processor, a first reprojection to generate a portion of a first image of a first view of a virtual space at a first rate. In some embodiments, the method includes determining an amount of change from the first view to a second view of the virtual space. In some embodiments, the method includes determining a portion of a second image of the second view of the virtual space to generate through a second reprojection. In some embodiments, the method includes performing, by the at least one processor, the second reprojection at a second rate to the portion of the second image according to the amount of change from the first view to the second view of the virtual space.

In some embodiments, the method includes performing, by the at least one processor, shading to generate another portion of the second image of the second view. In some embodiments, the method includes rendering, by the at least one processor, the second image including the another portion of the second image generated via the shading and the portion of the second image generated via the second reprojection. In some embodiments, a resolution of the second reprojection is different from a resolution of the first reprojection.

In some embodiments, the method includes comparing, by the at least one processor, the amount of change from the first view to the second view of the virtual space against a threshold amount. In some embodiments, performing, by the at least one processor, the second reprojection at the second rate to the portion of the second image includes performing, by the at least one processor, the second reprojection, at the second rate lower than the first rate, to the portion of the second image, in response to the amount of change from the first view to the second view of the virtual space exceeding the threshold amount.

In some embodiments, performing, by the at least one processor, the second reprojection at the second rate to the portion of the second image includes performing, by the at least one processor, the second reprojection with a resolution higher than a resolution of the first reprojection, in response to the amount of change from the first view to the second view of the virtual space exceeding the threshold amount. In some embodiments, performing, by the at least one processor, the first reprojection to generate the portion of the first image of the first view of the virtual space includes performing, by the at least one processor, the first reprojection using a bilinear filter. In some embodiments, performing, by the at least one processor, the second reprojection at the second rate to the portion of the second image includes performing, by the at least one processor, the second reprojection using a bicubic filter, in response to the amount of change from the first view to the second view of the virtual space exceeding the threshold amount. In some embodiments, determining the portion of the second image of the second view of the virtual space to generate through the second reprojection includes determining the portion of the second image of the second view associated with a motion vector less than a predetermined threshold.

Various embodiments disclosed herein are related to a device for rendering an image of virtual reality. In some embodiments, the device includes at least one processor configured to perform a first reprojection to generate a portion of a first image of a first view of a virtual space at a first rate. In some embodiments, the at least one processor is configured to determine an amount of change from the first view to a second view of the virtual space. In some embodiments, the at least one processor is configured to determine a portion of a second image of the second view of the virtual space to generate through a second reprojection. In some embodiments, the at least one processor is configured to perform the second reprojection at a second rate to the portion of the second image according to the amount of change from the first view to the second view of the virtual space.

In some embodiments, the at least one processor is configured to perform shading to generate another portion of the second image of the second view. In some embodiments, the at least one processor is configured to render the second image including the another portion of the second image generated via the shading and the portion of the second image generated via the second reprojection. In some embodiments, a resolution of the second reprojection is different from a resolution of the first reprojection.

In some embodiments, the at least one processor is configured to compare the amount of change from the first view to the second view of the virtual space against a threshold amount. In some embodiments, the at least one processor is configured to perform the second reprojection, at the second rate lower than the first rate, to the portion of the second image, in response to the amount of change from the first view to the second view of the virtual space exceeding the threshold amount. In some embodiments, the at least one processor is configured to perform the second reprojection with a resolution higher than a resolution of the first reprojection, in response to the amount of change from the first view to the second view of the virtual space exceeding the threshold amount. In some embodiments, the at least one processor is configured to perform the first reprojection using a bilinear filter, and perform the second reprojection using a bicubic filter, in response to the amount of change from the first view to the second view of the virtual space exceeding the threshold amount. In some embodiments, the at least one processor is configured to determine the portion of the second image of the second view associated with a motion vector less than a predetermined threshold.

Various embodiments disclosed herein are related to a device for rendering virtual reality. In some embodiments, the device includes at least one processor configured to perform a first reprojection to generate a portion of a first image of a first view of a virtual space at a first resolution. In some embodiments, the at least one processor is configured to determine an amount of change from the first view to a second view of the virtual space. In some embodiments, the at least one processor is configured to determine a portion of a second image of the second view of the virtual space to generate through a second reprojection. In some embodiments, the at least one processor is configured to perform the second reprojection at a second resolution to the portion of the second image according to the amount of change from the first view to the second view of the virtual space. In some embodiments, the at least one processor is configured to compare the amount of change from the first view to the second view of the virtual space against a threshold amount, and perform the second reprojection with the second resolution higher than the first resolution of the first reprojection, in response to the amount of change from the first view to the second view of the virtual space exceeding the threshold amount.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for rendering an image of a virtual object in a space of an artificial reality (e.g., an AR space, a VR space, or a MR space) through an adaptive reprojection. In one aspect, a change in view of the space of the artificial reality is determined, for example, according to a movement of a user wearing a HWD, a change in a gaze direction of the user, a movement of a virtual object within the space of the artificial reality, or a combination of them. According to the change in the view, a first portion of the view of the artificial reality to render through a shading process and a second portion of the view of the artificial reality to render through a reprojection process can be determined. A shading process may be performed to depict depth perception with varying levels of brightness or darkness, where a reprojection process may be performed to reuse a portion of the space of the artificial reality rendered in one or more images of previous frames. In one aspect, performing a shading process to generate a high resolution image (e.g., 1920 by 1080 pixels or higher) is computationally expensive and the shading process may not be completed before the next frame time starts. By performing a shading process to generate the first portion of the view and by performing a reprojection process to generate the second portion of the view, computational resources can be conserved and a high resolution image frame can be rendered before the next frame time starts without sacrificing fidelity of the image rendered. Despite the benefits of the reprojection, in case the view of the space of the artificial reality changes rapidly, frequent reprojection may cause blurring. In one aspect, in response to an amount of movement of a virtual object within the space of the artificial reality, the reprojection process can be adaptively adjusted, for example, by modifying a rate or a frequency of the reprojection and/or by modifying a resolution of the reprojection, such that blurring can be obviated.

Figure 1:
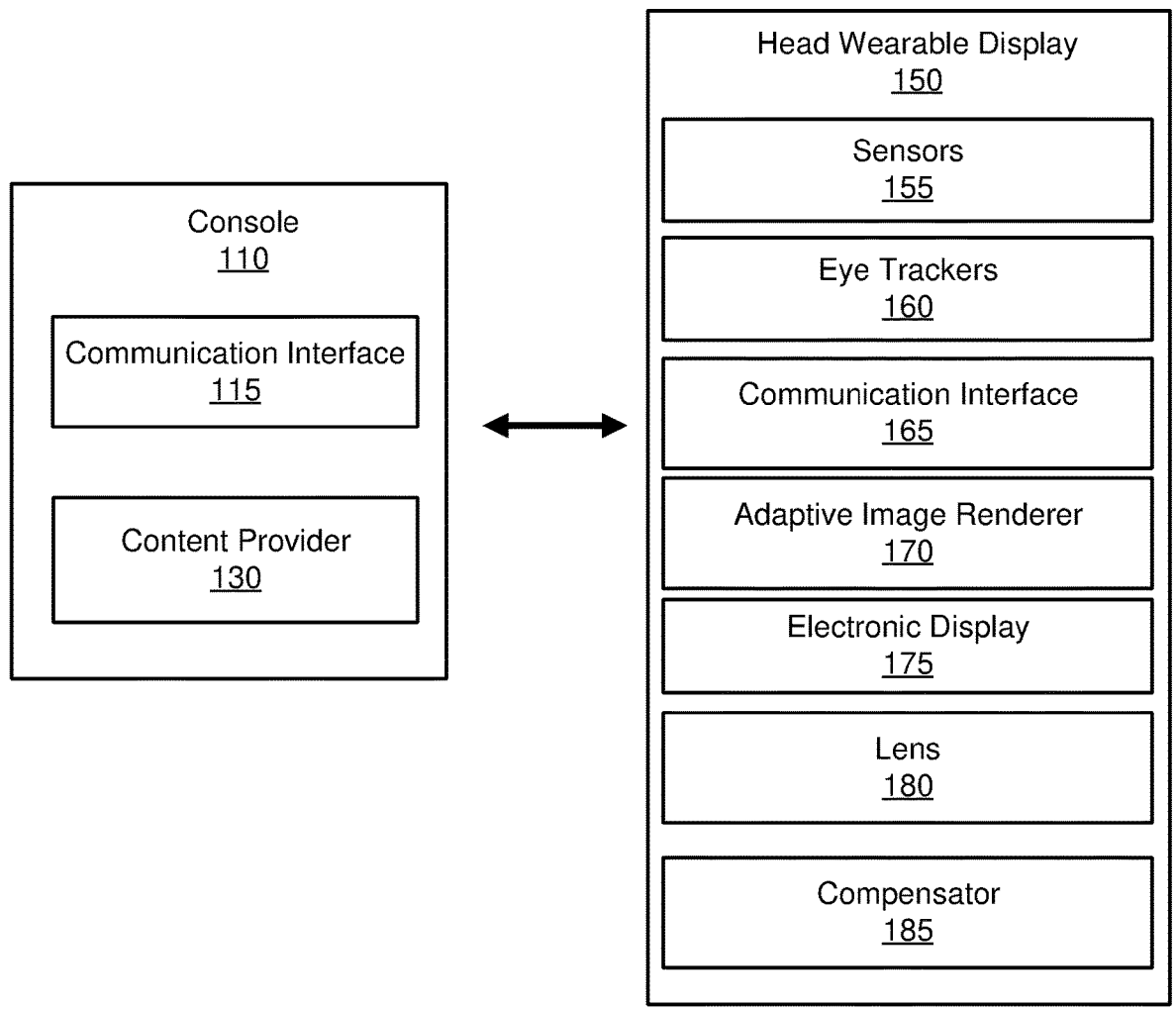
FIG. 1 is a diagram of a system environment including an artificial reality system, according to an example implementation of the present disclosure.

FIG. 1 is a block diagram of an example artificial reality system environment 100 in which a console 110 operates. In some embodiments, the artificial reality system environment 100 includes a HWD 150 worn by a user, and a console 110 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may detect its location and a gaze direction of the user wearing the HWD 150, and provide the detected location and the gaze direction to the console 110. The console 110 may determine a view within the space of the artificial reality corresponding to the detected location and the gaze direction, and generate an image depicting the determined view. The console 110 may provide the image to HWD 150 for rendering. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an adaptive image renderer 170, an electronic display 175, a lens 180, and a compensator 185. These components may operate together to detect a location and an orientation of the HWD 150 and/or a gaze direction of the user wearing the HWD 150, and render an image of a view within the artificial reality corresponding to the detected location and orientation of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and/or location of the HWD 150. In one aspect, the sensors 155 can detect the translational movement and the rotational movement with respect to a previous orientation and/or location of the HWD 150, and determine a new orientation and location of the HWD 150 by accumulating or integrating the detected translational movement and/or the rotational movement. Assuming for example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In the embodiments, in which the console 110 and the head wearable display 175 are implemented on a single system, the communication interface 165 may communicate with the console 110 through a bus connection or a conductive trace. Through the communication link, the communication interface 165 may transmit to the console 110 data indicating the determined location of the HWD 150 and the determined gaze direction of the user. Moreover, through the communication link, the communication interface 165 may receive from the console 110 data indicating image to be rendered.

In some embodiments, the adaptive image renderer 170 includes an electronic component or a combination of an electronic component and a software component that adaptively generates one or more images for display, for example, according to a change in view of the space of the artificial reality. In some embodiments, the adaptive image renderer 170 is implemented as a processor (or a graphical processing unit (GPU)) that executes instructions to perform various functions described herein. The adaptive image renderer 170 may receive, through the communication interface 165, data describing an image to be rendered, and render the image through the electronic display 175. In some embodiments, the data from the console 110 may be compressed or encoded, and the adaptive image renderer 170 may decompress or decode the data to generate and render the image. In one aspect, the process of detecting, by the HWD 150, the location and the orientation of the HWD 150 and/or the gaze direction of the user wearing the HWD 150, and generating and transmitting, by the console 110, a high resolution image (e.g., 1920 by 1080 pixels) corresponding to the detected location and the gaze direction to the HWD 150 may be computationally exhaustive and may not be performed within a frame time (e.g., less than 11 ms). In one aspect, the adaptive image renderer 170 generates one or more images through a shading process and a reprojection process when an image from the console 110 is not received within the frame time. For example, the shading process and the reprojection process may be performed adaptively, according to a change in view of the space of the artificial reality. Hence, a communication bandwidth between the console 110 and the HWD 150 can be reduced, and a high resolution image can be presented to the user without sacrificing fidelity. Detailed description on the shading process and the reprojection process are provided below with respect to FIGS. 3-6.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the adaptive image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the adaptive image renderer 170 to compensate for the distortions caused by the lens 180, and apply the determined compensation to the image from the adaptive image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view of the artificial reality corresponding to the location of the HWD 150 and the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link. Through the communication link, the communication interface 115 may receive from the HWD 150 data indicating the determined location and orientation of the HWD 150 and/or the determined gaze direction of the user. Moreover, through the communication link, the communication interface 115 may transmit to the HWD 150 data describing an image to be rendered.

The content provider 130 is a component that generates content to be rendered according to the location and orientation of the HWD 150 and/or the gaze direction of the user of the HWD 150. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within a virtual space, and determines a view of the virtual space along a direction corresponding to the orientation of the HWD 150 and the gaze direction of the user from the mapped location in the virtual space. The content provider 130 may generate image data describing an image of the determined view of the virtual space, and transmit the image data to the HWD 150 through the communication interface 115. In some embodiments, the content provider 130 generates metadata including motion vector information, depth information, edge information, object information, etc., associated with the image, and transmits the metadata with the image data to the HWD 150 through the communication interface 115. The content provider 130 may compress and/or encode the data describing the image, and can transmit the compressed and/or encoded data to the HWD 150. In some embodiments, the content provider 130 generates and provides the image to the HWD 150 periodically (e.g., every one second).

Figure 2:
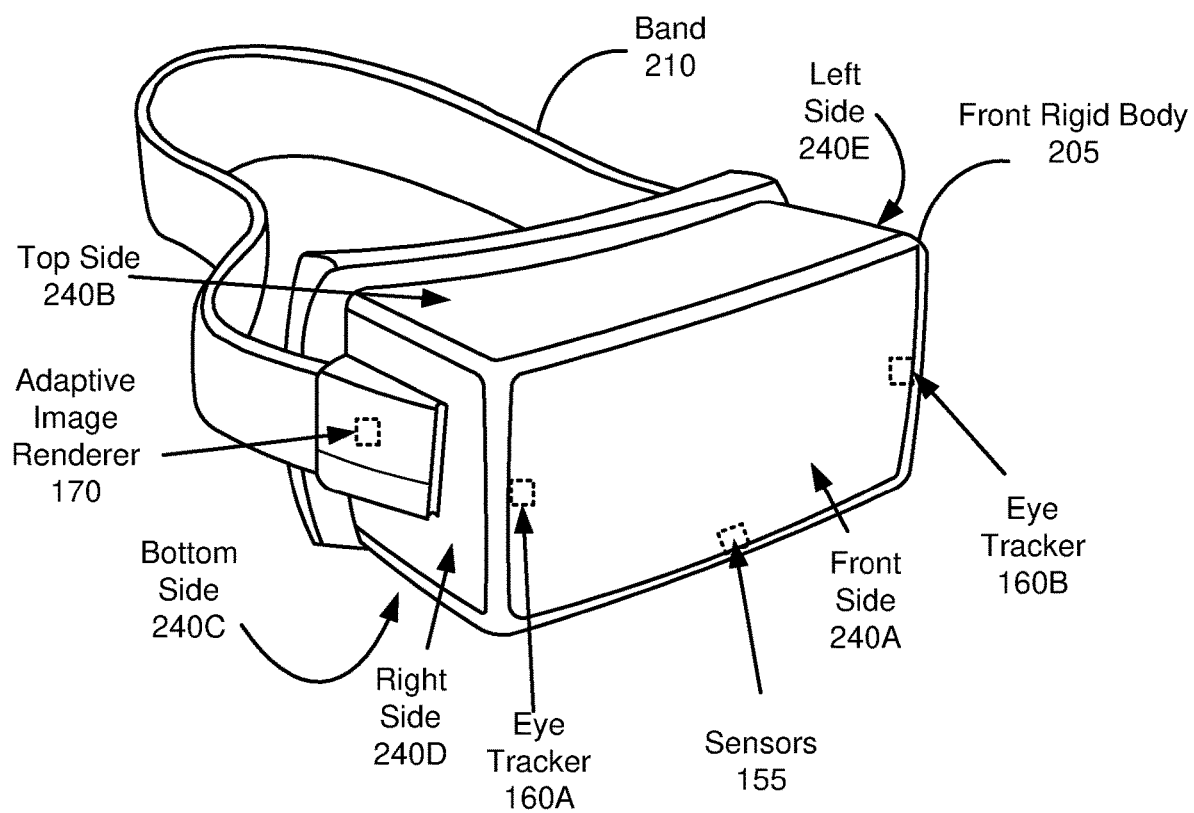
FIG. 2 is a diagram of a head wearable display, according to an example implementation of the present disclosure.

FIG. 2 is a diagram of the HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, and the adaptive image renderer 170. In the embodiment shown by FIG. 2, the sensors 155 are located within the front rigid body 205, and the sensors 155 are not visible to the user. In other embodiments, the HWD 150 has a different configuration than shown in FIG. 2. For example, the adaptive renderer 170, the eye trackers 160A, 160B, and/or the sensors 155 may be in different locations than shown in FIG. 2.

Figure 3A:
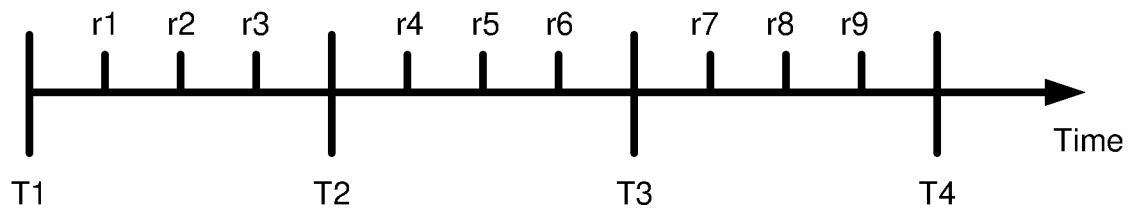
FIGS. 3A-3C are timing diagrams with different rates of reprojection, according to an example implementation of the present disclosure.
Figure 3B:
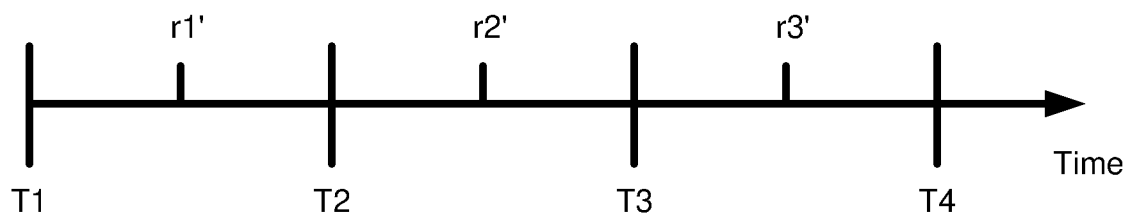
Figure 3C:
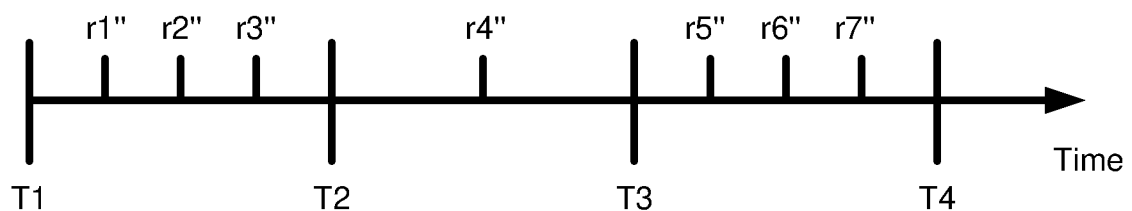

FIGS. 3A-3C are timing diagrams with different rates of reprojection, according to an example implementation of the present disclosure. In one aspect, images are periodically refreshed at refresh times T1, T2, T3, T4 (e.g., every 1 second). At each refresh time, a portion of an image to generate through a shading process and a portion of the image to generate through a reprojection process can be determined, for example, according to a change in a view of the artificial reality. Between the refresh times, one or more reprojection processes are performed. For example, reprojections are performed at a constant rate or frequency at times r1, r2, r3 within a time period between the refresh times T1 and T2, at times r4, r5, r6 within a time period between the refresh times T2 and T3, and at times r7, r8, r9 within a time period between the refresh times T3 and T4, as shown in FIG. 3A. For another example, reprojections are performed periodically at time r1' within a time period between the refresh times T1 and T2, at time r2' within a time period between the refresh times T2 and T3, and at time r3' within a time period between the refresh times T3 and T4, as shown in FIG. 3B. In one aspect, more frequent reprojections as shown in FIG. 3A compared to as shown in FIG. 3B may allow the shading process to be more effective. However, in case a view within a space of an artificial reality changes rapidly, frequent reprojections may cause blurring. In one aspect, image blurring occurs due to repeated filtered resampling of a source signal (such as a 2D image) under motion. The resampling filter may flatten out the higher frequencies when the sample coordinates are ever so slightly shifted and the process is repeated over a number of reprojections (or passes). The output of the previous portion of the frame or image may be used as the input into the next reprojection or pass, where blurring can be accumulated through a number of reprojections (or passes) and can be visually evident or noticeable.

In some embodiments, a rate of reprojection is adjusted dynamically according to a change in a view of the artificial reality space (e.g., a space of the artificial reality). For example, a change in the view of the artificial reality space can be caused according to a movement of a user wearing a HWD, a change in a gaze direction of the user, a movement of a virtual object within the space of the artificial reality, or a combination of them. In one aspect, a change in the view of the space of the artificial reality can be determined according to metadata (e.g., motion vector information, depth information, edge information, etc.) associated an image. Referring to FIG. 3C, assuming for an example that a change in the view of the space of the artificial reality is less than a predetermined threshold during a time period between the refresh times T1 and T2, and during a time period between the refresh times T3 and T4, but is greater than the predetermined threshold during a time period between the refresh times T2 and T3. In this example, during a time period between the refresh times T1 and T2, and during a time period between the refresh times T3 and T4, the rate of reprojection can be maintained as shown in FIG. 3A, where during a time period between the refresh times T2 and T3, the rate of reprojection can be reduced as shown in FIG. 3B, in response to the change in the view of the space of the artificial reality exceeding the predetermined threshold during a time period between the refresh times T2 and T3. By dynamically adjusting a rate of reprojection, blurring due to frequent reprojections can be obviated.

Figure 4:
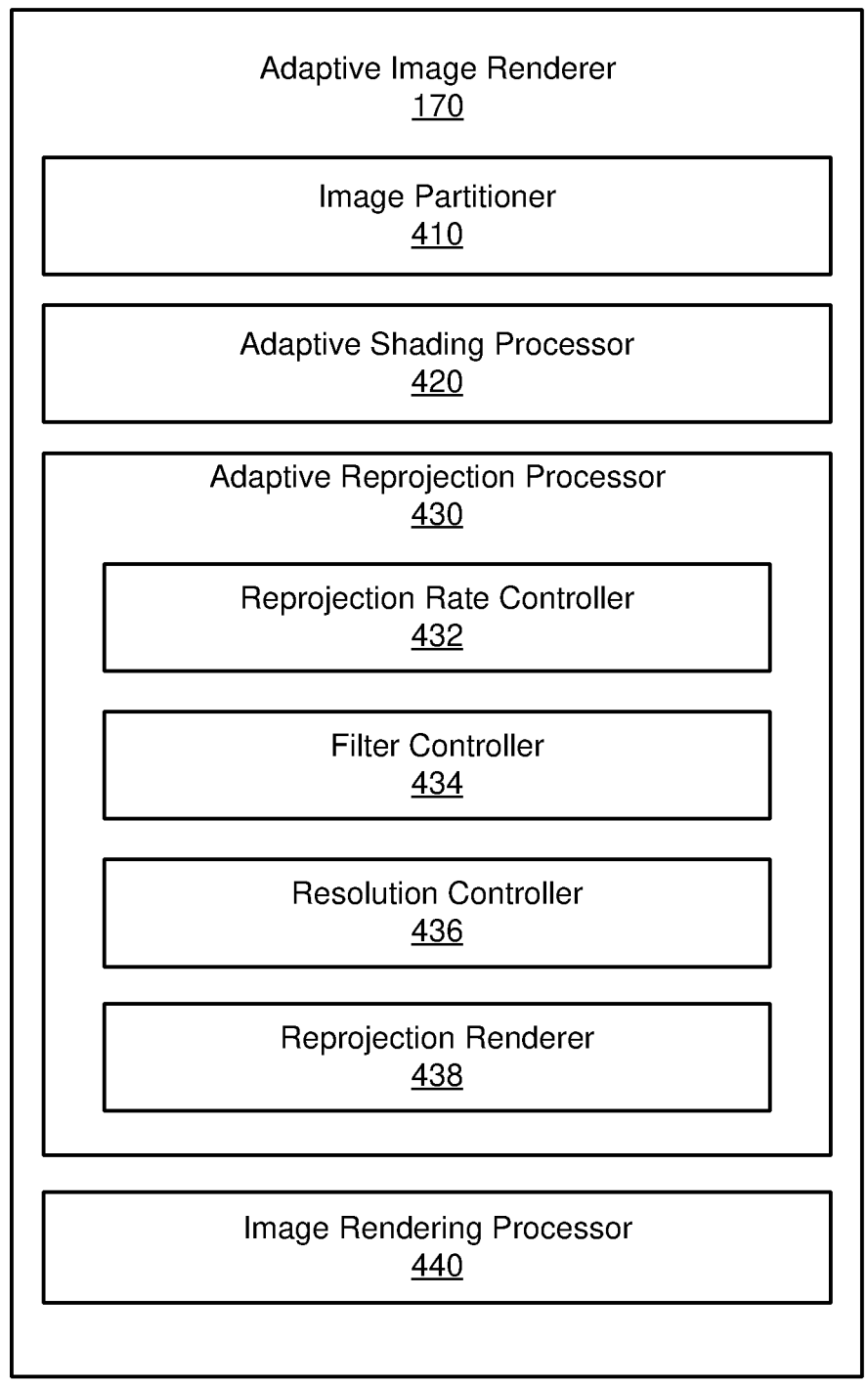
FIG. 4 is a diagram of an adaptive image renderer, according to an example implementation of the present disclosure.

FIG. 4 is a diagram of an adaptive image renderer 170, according to an example implementation of the present disclosure. In some embodiments, the adaptive image renderer 170 includes an image partitioner 410, an adaptive shading processor 420, an adaptive reprojection processor 430, and an image rendering processor 440. These components may operate to adaptively perform a shading process and a reprojection process, according to a change in a view of an artificial reality. In other embodiments, the adaptive image renderer 170 includes more, fewer, or different components than shown in FIG. 4. In some embodiments, the adaptive image renderer 170 is designed and implemented to store or maintain a version (e.g., details) of the world view corresponding to the artificial reality, even the unrendered parts of the world view. The adaptive image renderer 170 can access, apply and/or render the details of the world view, e.g., as predictions about the 3D space of the artificial reality, as these come into view of a user due to movement or interaction.

The image partitioner 410 may include a component that determines different portions of an image to generate through a shading process and a reprojection, according to a change in a view of an artificial reality. In some embodiments, the image partitioner 410 determines or identifies different portions of the image to generate through the shading process and the reprojection process periodically at a refresh time (e.g., every one second). The refresh time may be predetermined or may be set according to a user input. In one approach, the image partitioner 410 determines the change in the view of the artificial reality, according to metadata associated with the image. For example, the metadata can indicate or include depth information, motion vector information, and edge information. In one approach, the image partitioner 410 determines a portion of an image corresponding to motion vectors having amplitudes exceeding a predetermined threshold, and determines to generate that portion of the image through a shading process. In one approach, the image partitioner 410 determines a portion of the image with an amount of change in depth from its previous image exceeding a predetermined threshold, and may in response determine to generate that portion of the image through a shading process. In one approach, the image partitioner 410 determines a portion of the image corresponding to an edge of a virtual object, and may in response determine to generate that portion of the image through a shading process. The image partitioner 410 may aggregate or combine different portions determined according to motion vectors, depth and edges into a first portion of the image to generate through the shading process. The image partitioner 410 may determine to generate a remaining portion (or a second portion) of the image through a reprojection process. In one aspect, a shading process is computationally exhaustive. In one example, the image partitioner 410 determines to generate 15-20% of the image through a shading process, and determines to generate 80~85% of the image through a reprojection process to save computational resources and/or achieve bandwidth efficiency.

The adaptive shading processor 420 can correspond to a component that generates the first portion of the image through a shading process. In one approach, the adaptive shading processor 420 simulates light from a virtual light source projected on a virtual object and represents shading on one or more surfaces of the virtual object according to the light. For example, the shading is represented with different brightness or darkness, according to light from the virtual light source incident on one or more surfaces of the virtual object. In one approach, brightness or darkness is determined according to a normal vector of a surface of a virtual object with respect to the virtual light source and a distance of the surface of the virtual object from the light source to represent depth in a three dimensional space of the virtual object.

In some embodiments, the adaptive shading processor 420 adaptively adjusts a resolution of shadings performed. In one aspect, the adaptive shading processor 420 performs different levels of resolutions of shadings according to depth information, motion vector information, and edge information. In one aspect, the adaptive shading processor 420 determines, within the first portion of the image determined by the image partitioner 410, different areas to perform shading and corresponding levels of resolutions of shadings. For example, the adaptive shading processor 420 can perform the highest level of resolution of shading to generate a first area of the image with an edge of a virtual object within a foveated area to represent details of shadings, and perform a lower level of resolution of shading lower than the highest level to generate a second area that is adjacent to the first area away from the edge to represent lesser details of the shadings. In one approach, for different areas, different levels of resolutions of shading can be performed by changing sizes of tiles in different areas of the image. For example, a higher level of resolution of shading can be performed to generate an area of the image by decreasing a size of a tile or decreasing a number of pixels per tile in the area of the image such that finer details of shadings can be represented for the area of the image. Conversely, a lower level of resolution of shading can be performed to generate another area of the image by increasing a size of a tile or a number of pixels per tile in the another area of the image such that lesser details of shadings can be represented for the another area of the image. By performing different levels of resolutions of shadings to different areas, computational resources can be conserved by allocating less computational resources to perform a shading process with lower levels of resolutions to areas, in which the details of the shadings are less significant.

In some embodiments, the adaptive shading processor 420 performs different levels of resolutions of shadings according to the rate of reprojection. For example, the adaptive shading processor 420 may perform shading at a first pixel resolution in response to a first rate of reprojection. The adaptive shading processor 420 may perform shading at a second pixel resolution lower than the first pixel resolution in response to a second rate of reprojection that is greater than the first rate of reprojection. The adaptive shading processor 420 may perform shading at a second pixel resolution higher than the first pixel resolution in response to a second rate of reprojection that is lower than the first rate of reprojection. In some embodiments, the adaptive shading processor 420 may perform shading at a second pixel resolution higher than the first pixel resolution in response to a second rate of reprojection that is greater than the first rate of reprojection, and may perform shading at a second pixel resolution lower than the first pixel resolution in response to a second rate of reprojection that is lower than the first rate of reprojection.

The adaptive reprojection processor 430 may include or correspond to a component that generates a second portion of the image determined by the image partitioner through a reprojection process. In one aspect, the adaptive reprojection processor 430 includes a reprojection rate controller 432, a filter controller 434, a resolution controller 436, and a reprojection renderer 438. These components may operate together to adaptively perform reprojection according to a change in a view of a space of an artificial reality. In some embodiments, the adaptive reprojection processor 430 includes more, fewer, or different components than shown in FIG. 4.

The reprojection rate controller 432 is a component that determines a rate or a frequency of reprojection to be applied, according to a change in a view of the space of the artificial reality. In one approach, the reprojection rate controller 432 determines a rate of reprojection according to an amount of change in the view of the space of the artificial reality. The reprojection rate controller 432 may increase the rate of reprojection, in response to detecting that the amount of change in the view of the space of the artificial reality is less than a predetermined threshold amount. For example, if the motion vector in the second portion of the image is less than a predetermined threshold or if the change in the depth of a virtual object in the second portion of the image is less than a predetermined threshold, then the reprojection rate controller 432 may increase the rate of reprojection. Similarly, the reprojection rate controller 432 may decrease the rate of reprojection, in response to detecting that the amount of change in the view of the space of the artificial reality exceeds a predetermined threshold amount. For example, if the motion vector in the second portion of the image exceeds a predetermined threshold or if the change in the depth of a virtual object in the second portion of the image exceeds a predetermined threshold, then the reprojection rate controller 432 may decrease the rate of reprojection. By adaptively adjusting a rate of reprojection according to the change in the view of the artificial reality, blurring due to frequent reprojection can be obviated.

The filter controller 434 can include or correspond to a component that determines a type of filtering to be applied for reprojection, according to a change in a view of the space of the artificial reality. In one approach, the filter controller 434 determines a type of filtering according to an amount of change in the view of the space of the artificial reality. For example, if the motion vector in the second portion of the image is less than a predetermined threshold or if the change in the depth of a virtual object in the second portion of the image is less than a predetermined threshold, then the filter controller 434 may determine to apply a bilinear filtering for the reprojection. For example, if the motion vector in the second portion of the image exceeds a predetermined threshold or if the change in the depth of a virtual object in the second portion of the image exceeds a predetermined threshold, then the filter controller 434 may determine to apply a bicubic filtering for the reprojection. In some embodiments, the type of filtering may be predetermined (e.g., bicubic) or set according to the user input. Various types of filtering (or processing) applied can be selectively applied, which can include for instance deblurring, image stabilizing, and/or supersampling processes.

The resolution controller 436 can include or correspond to a component that determines a resolution of reprojection, according to a change in a view of the space of the artificial reality. In one aspect, the resolution controller 436 performs different levels of resolutions of reprojections according to depth information, motion vector information, and edge information. In one aspect, the resolution controller 436 may determine, within the second portion of the image determined by the image partitioner 410, different areas to perform reprojection and corresponding levels of resolutions of reprojection. For example, the resolution controller 436 can determine a first area within the second portion the image farthest away from the first portion of the image to generate through the shading process, and determine to perform the lowest level of resolution of reprojection to generate the first area. For another example, the resolution controller 436 can determine a second area within the second portion of the image adjacent to the first area closer to the first portion of the image to generate through the shading process, and determine to perform a higher level of resolution of reprojection higher than the lowest level of resolution to generate the second area. In one approach, for different areas, corresponding levels of resolutions of reprojection can be performed by changing sizes of tiles in different areas. For example, a higher level of resolution of reprojection can be applied by decreasing a size of a tile or decreasing a number of pixels per tile such that filtering can be applied per lower number of pixels. Conversely, a lower level of resolution of shading can be applied by increasing a size of a tile or a number of pixels per tile such that filtering can be applied per higher number of pixels.

The reprojection renderer 438 can include or correspond to a component that generates the second portion of the image according to parameters determined by the reprojection rate controller 432, the filter controller 434, the resolution controller 436, or a combination of them. In one approach, the reprojection renderer 438 reuses tiles in a portion of one or more previous images corresponding to the second portion of the image. For example, the reprojection renderer 438 applies filtering to the tiles in the one or more previous images to generate the second portion of the image. In one aspect, the reprojection renderer 438 performs different rates of reprojection, different resolution of reprojection to generate different areas or tiles of the second portion of the image, according to the determined parameters.

The image rendering processor 440 can include or correspond to a component that generates an image to render according to the shading process performed by the adaptive shading processor 420 and the reprojection process performed by the adaptive reprojection processor 430. In one aspect, the image rendering processor 440 combines the first portion of the image generated by the adaptive shading processor 420 and the second portion of the image generated by the adaptive reprojection processor 430 to generate the image to be rendered. The image rendering processor 440 may provide the combined image to the electronic display 175 for presentation. In some embodiments, the image generated by the image rendering processor 440 may be processed or compensated by the compensator 185 to correct for optical aberrations or distortions.

Figure 5A:
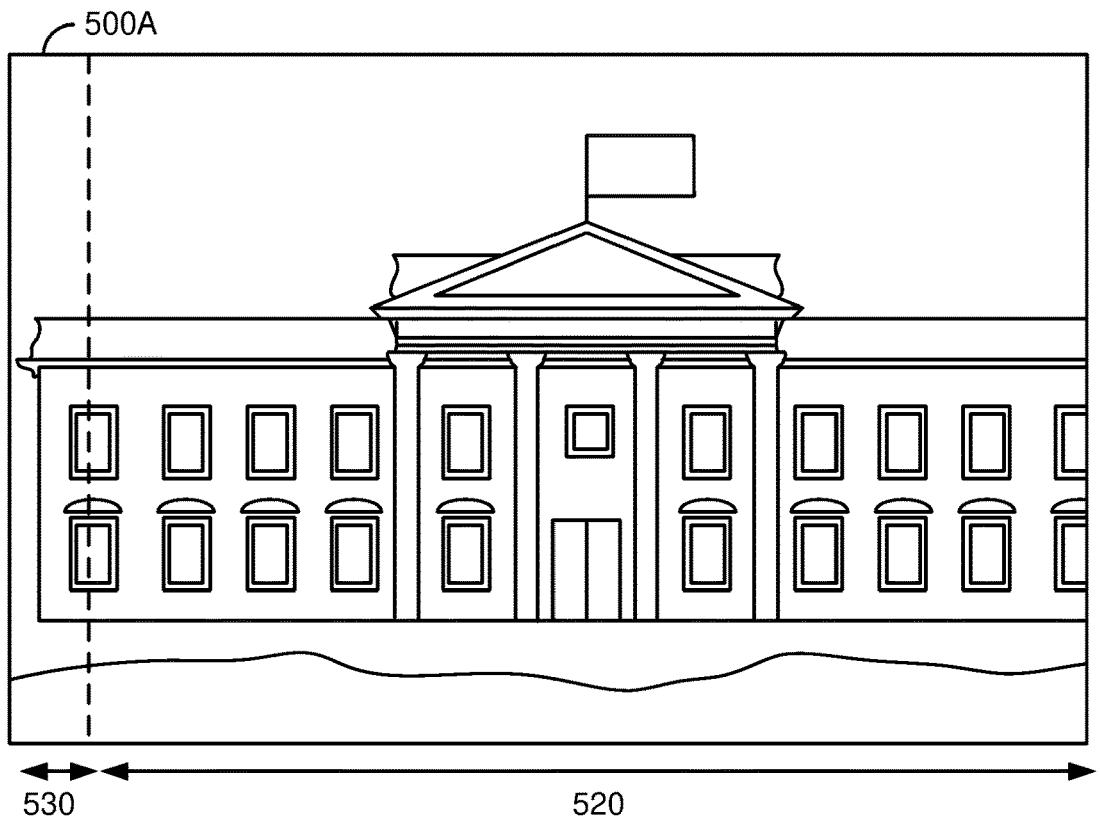
FIG. 5A is an example image of a first view of a virtual reality, according to an example implementation of the present disclosure.
Figure 5B:
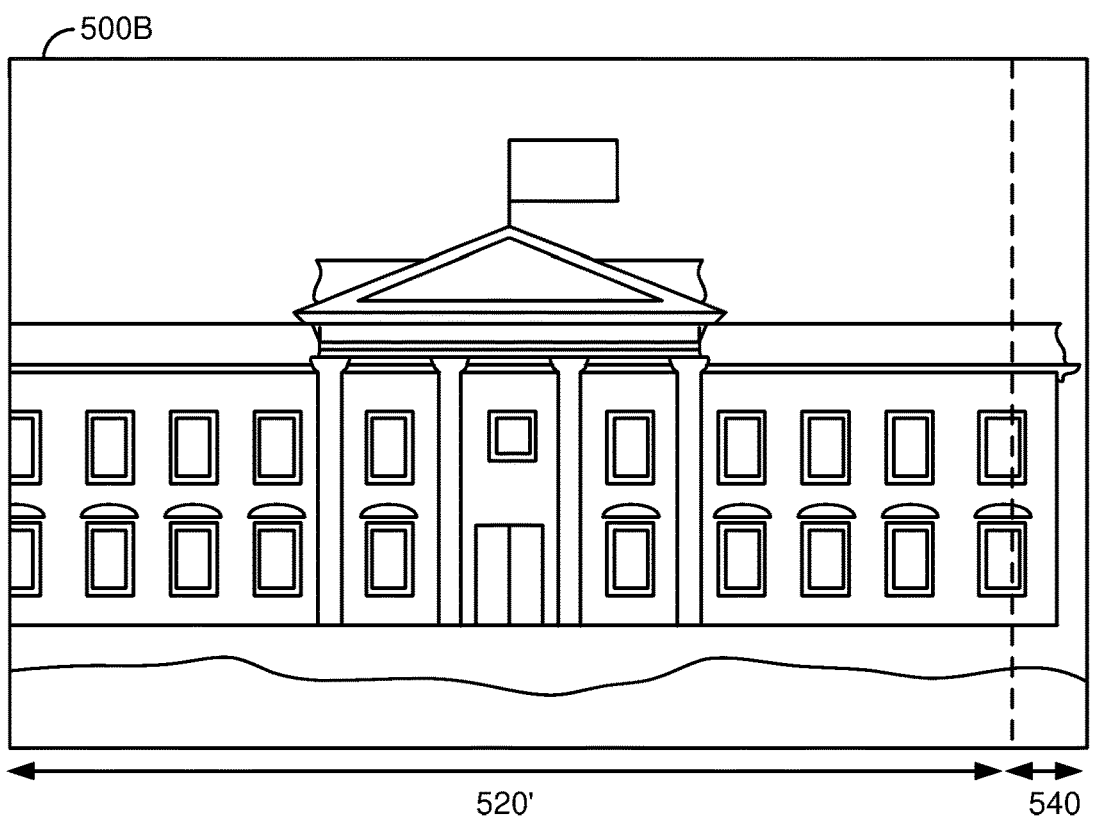
FIG. 5B is an example image of a second view of the virtual reality, according to an example implementation of the present disclosure.

FIG. 5A is an example image of a first view 500A of a virtual reality, and FIG. 5B is an example image 500B of a second view of the virtual reality, according to an example implementation of the present disclosure. For example, a user wearing a HWD 150 has rotated his head to the right, such that a view within the virtual reality changes as shown in the image 500A to the image 500B according to the user movement. In this example, a portion 530 of the first image 500A showing a left edge of a building is not included in the second image 500B, and a portion 540 of the second image 500B showing a right edge of the building not included in the first image 500A is included in the second image 500B. A portion 520 of the first image 500A is also shown or included as a portion 520' in the second image 500B. In one aspect, the image 500B of the virtual reality is presented to the user through a reprojection process and a shading process. For example, the portion 520' of the image 500B is generated by performing reprojection on the portion 520 of the image 500A, where the portion 540 of the image 500B is newly generated through a shading process. After the reprojection and the shading, the image 500B can be rendered and presented to the user through the HWD 150.

In some embodiments, the reprojection and the shading can be performed adaptively, according to an amount of change in the view of the virtual reality. For example, the adaptive image renderer 170 can determine the amount of change in the view within a time period according to the user movement, and determine configurations of the shading and/or reprojection according to the determined amount of change, as described above with respect to FIGS. 1-4. For example, the adaptive image renderer 170 can set or change a rate of reprojection, filtering applied to the reprojection, resolution of the reprojection, or any combination of them according to the amount of change in the view of the virtual reality. By adaptively performing and/or adjusting reprojection according to the amount of change in the view of the virtual reality, blurring due to frequent reprojections can be reduced or obviated.

Figure 6:
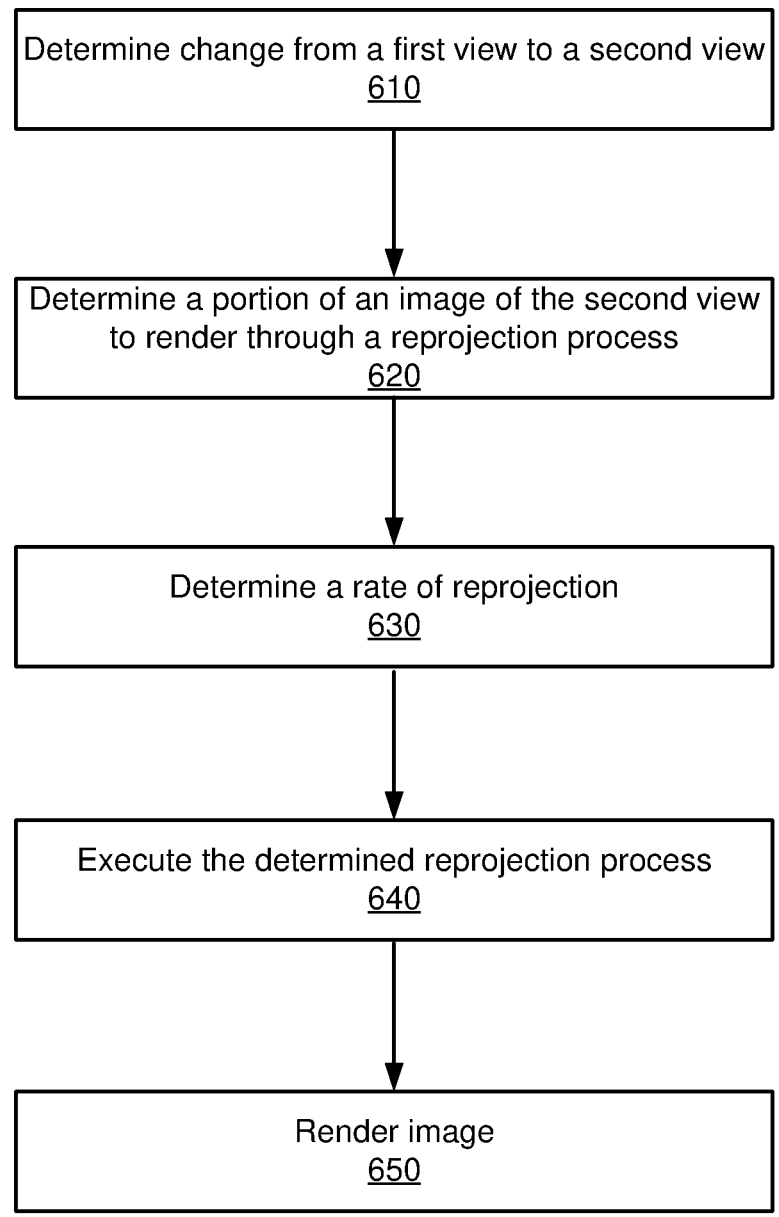
FIG. 6 is a flow chart illustrating a process of rendering an image through an adaptive reprojection, according to an example implementation of the present disclosure.

FIG. 6 is a flow chart illustrating a process 600 of rendering an image through an adaptive reprojection, according to an example implementation of the present disclosure. In some embodiments, the process 600 is performed by the adaptive image renderer 170 of FIG. 1 or FIG. 4. In some embodiments, the process 600 is performed by other entities. For example, the process 600 may be performed by the HWD 150 and the console 110 together. In some embodiments, the process 600 includes more, fewer, or different steps than shown in FIG. 6.

In one approach, the adaptive image renderer 170 determines 610 a change from a first view to a second view of a space of an artificial reality. A change in view of the space of the artificial reality may be determined, for example, according to a movement of a user wearing the HWD 150, a change in a gaze direction of the user, a movement of a virtual object within the space of the artificial reality, or a combination of two or more of these. In one example, the adaptive image renderer 170 determines the amount of change from a first view to a second view according to metadata indicating motion vector information, depth information, edge information, etc. For example, motion vectors or a change in depth can indicate a change or a movement of a virtual object.

In one approach, the adaptive image renderer 170 determines 620 a portion of an image of the second view of the space of the artificial reality to render through a reprojection process. The adaptive image renderer 170 may determine the portion of the image of the second view to render through the reprojection process during a refresh time period. In one approach, the adaptive image renderer 170 determines a portion of an image corresponding to motion vectors having amplitudes (e.g., representing amounts of change relative to a prior image for instance) less than a predetermined threshold, and determines to generate that portion of the image through a reprojection process. In one approach, the adaptive image renderer 170 determines a portion of the image with an amount of change in depth from its previous image less than a predetermined threshold, and determines to generate that portion of the image through a reprojection process. In one approach, the adaptive image renderer 170 determines a portion of the image away from an edge of a virtual object by a predetermined threshold distance, and determines to generate that portion of the image through a reprojection process.

In one approach, the adaptive image renderer 170 determines 630 a rate of reprojection (e.g., a constant, average or mean rate, and/or an instantaneous rate). The adaptive image renderer 170 may determine this rate as an updated rate of reprojection (e.g., different from an earlier or prior rate of reprojection, which may have been applied to a portion of the image of the first view). The adaptive image renderer 170 may determine the rate of reprojection during the refresh time period. For example, if the motion vector in a portion of the image is less than a predetermined threshold or if the change in the depth of a virtual object in the portion of the image is less than a predetermined threshold, then the adaptive image renderer 170 may change or increase the rate of reprojection (e.g., relative to the prior rate of reprojection). For example, if the motion vector in the portion of the image exceeds a predetermined threshold or if the change in the depth of a virtual object in the second portion of the image exceeds a predetermined threshold, then the adaptive image renderer 170 may change or decrease the rate of reprojection (e.g., relative to the prior rate of reprojection).

In one approach, the adaptive image renderer 170 executes 640 the reprojection process according to the determined rate to generate the determined portion of the second view of the space of the artificial reality, and render 550 the image according to the reprojection. In one approach, the adaptive image renderer 170 performs the reprojection process to generate the image by applying filtering to areas of the one or more previous images corresponding to the determined portion of the second view. In one approach, the adaptive image renderer 170 applies a bicubic filtering, a bilinear filtering, and/or other type(s) of filtering. In one approach, the adaptive image renderer 170 changes a type of filtering applied and/or a resolution of reprojection performed according to the amount of change in the view of the space of the artificial reality. For example, a higher resolution of reprojection (e.g., using bicubic filtering) can be performed, if the motion vector in a portion of the image exceeds a predetermined threshold or if the change in the depth of a virtual object in the portion of the image exceeds a predetermined threshold. For another example, a lower resolution of reprojection (e.g., using filtering other than bicubic filtering, such as bilinear filtering) can be performed, if the motion vector in a portion of the image is less than a predetermined threshold or if the change in the depth of a virtual object in the portion of the image is less than a predetermined threshold. Advantageously, by adaptively performing reprojection according to the change in the view of the artificial reality, blurring due to frequency reprojection can be obviated.

Figure 7:
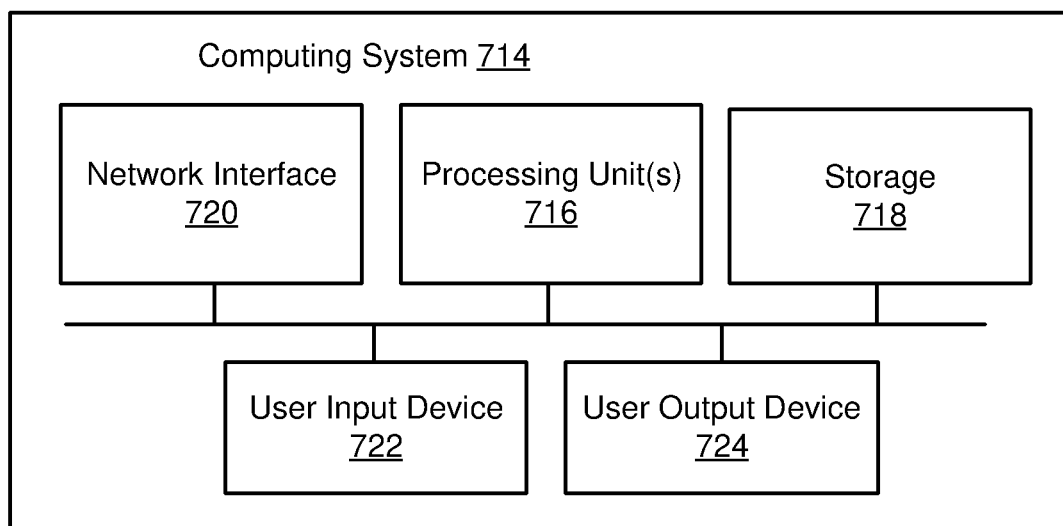
FIG. 7 is a block diagram of a computing environment according to an example implementation of the present disclosure.

Various operations described herein can be implemented on computer systems. FIG. 7 shows a block diagram of a representative computing system 714 usable to implement the present disclosure. In some embodiments, the console 110, the HWD 150 or both of FIG. 1 are implemented by the computing system 714. Computing system 714 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 714 can be implemented to provide VR, AR, MR experience. In some embodiments, the computing system 714 can include conventional computer components such as processors 716, storage device 718, network interface 720, user input device 722, and user output device 724.

Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 722 can include any device (or devices) via which a user can provide signals to computing system 714; computing system 714 can interpret the signals as indicative of particular user requests or information. User input device 722 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It should be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   performing, by at least one processor, a first number of reprojections during a first time period to generate a portion of a first image of a first view of a virtual space at a first reprojection rate;
   determining an amount of change from the first view to a second view of the virtual space;
   determining a portion of a second image of the second view of the virtual space;
   determining a second reprojection rate to perform a second number of reprojections during a second time period, according to the amount of change from the first view to the second view of the virtual space; and
   performing, by the at least one processor, the second number of reprojections during the second time period at the second reprojection rate to the portion of the second image.

2. The method of claim 1, further comprising:
   performing, by the at least one processor, shading to generate another portion of the second image of the second view.

3. The method of claim 2, further comprising:
   rendering, by the at least one processor, the second image including the another portion of the second image generated via the shading and the portion of the second image generated via the second number of reprojections.

4. The method of claim 1, wherein a resolution of each reprojection of the second number of reprojections is different from a resolution of each reprojection of the first number of reprojections.

5. The method of claim 1, further comprising:
   comparing, by the at least one processor, the amount of change from the first view to the second view of the virtual space against a threshold amount.

6. The method of claim 5, wherein determining the second reprojection rate to perform the second number of reprojections during the second time period includes:
   determining the second reprojection rate to be lower than the first reprojection rate such that the second number is lower than the first number, in response to the amount of change from the first view to the second view of the virtual space exceeding the threshold amount.

7. The method of claim 5, wherein performing, by the at least one processor, the second number of reprojections at the second reprojection rate to the portion of the second image includes:
   performing, by the at least one processor, the second number of reprojections with a resolution higher than a resolution of each reprojection of the first number of reprojections, in response to the amount of change from the first view to the second view of the virtual space exceeding the threshold amount.

8. The method of claim 5,
   wherein performing, by the at least one processor, the first number of reprojections to generate the portion of the first image of the first view of the virtual space includes performing, by the at least one processor, the first number of reprojections using a bilinear filter, and
   wherein performing, by the at least one processor, the second number of reprojections at the second reprojection rate to the portion of the second image includes performing, by the at least one processor, the second number of reprojections using a bicubic filter, in response to the amount of change from the first view to the second view of the virtual space exceeding the threshold amount.

9. The method of claim 1, wherein determining the portion of the second image of the second view of the virtual space includes:
   determining the portion of the second image of the second view associated with a motion vector less than a predetermined threshold.

10. A device comprising:
    at least one processor configured to:
    perform a first number of reprojections during a first time period to generate a portion of a first image of a first view of a virtual space at a first reprojection rate;
    determine an amount of change from the first view to a second view of the virtual space;
    determine a portion of a second image of the second view of the virtual space;
    determine a second reprojection rate to perform a second number of reprojections during a second time period, according to the amount of change from the first view to the second view of the virtual space; and
    perform the second number of reprojections during the second time period at the second reprojection rate to the portion of the second image.

11. The device of claim 10, wherein the at least one processor is configured to perform shading to generate another portion of the second image of the second view.

12. The device of claim 11, wherein the at least one processor is configured to render the second image including the another portion of the second image generated via the shading and the portion of the second image generated via the second number of reprojections.

13. The device of claim 10, wherein a resolution of each reprojection of the second number of reprojections is different from a resolution of each reprojection of the first number of reprojections.

14. The device of claim 10, wherein the at least one processor is configured to compare the amount of change from the first view to the second view of the virtual space against a threshold amount.

15. The device of claim 14, wherein the at least one processor is configured to determine the second reprojection rate to be lower than the first reprojection rate such that the second number is lower than the first number, in response to the amount of change from the first view to the second view of the virtual space exceeding the threshold amount.

16. The device of claim 14, wherein the at least one processor is configured to perform the second number of reprojections with a resolution higher than a resolution of each reprojection of the first number of reprojections, in response to the amount of change from the first view to the second view of the virtual space exceeding the threshold amount.

17. The device of claim 14, wherein the at least one processor is configured to:
    perform the first number of reprojections using a bilinear filter, and
    perform the second number of reprojections using a bicubic filter, in response to the amount of change from the first view to the second view of the virtual space exceeding the threshold amount.

18. The device of claim 10, wherein the at least one processor is configured to determine the portion of the second image of the second view associated with a motion vector less than a predetermined threshold.

19. A device comprising:
    at least one processor configured to:
        perform a first reprojection to generate a portion of a first image of a first view of a virtual space at a first resolution of pixels per tile;
        determine an amount of change from the first view to a second view of the virtual space;
        determine a portion of a second image of the second view of the virtual space;
        determine a second resolution of pixels per tile to perform a second reprojection, according to the amount of change from the first view to the second view of the virtual space; and
        perform the second reprojection at the second resolution to the portion of the second image.

20. The device of claim 19, wherein the at least one processor is configured to:
    compare the amount of change from the first view to the second view of the virtual space against a threshold amount; and
    perform the second reprojection with the second resolution higher than the first resolution of the first reprojection, in response to the amount of change from the first view to the second view of the virtual space exceeding the threshold amount.

* * * * *